United States Patent
Lee

(10) Patent No.: US 8,363,030 B2
(45) Date of Patent: Jan. 29, 2013

(54) TOUCH PANEL WITH MESH-SHAPED SENSOR AND METHOD FOR MAKING THE SAME

(75) Inventor: Chi-Ming Lee, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 884 days.

(21) Appl. No.: 12/493,341

(22) Filed: Jun. 29, 2009

(65) Prior Publication Data

US 2010/0123671 A1    May 20, 2010

(30) Foreign Application Priority Data

Nov. 18, 2008    (CN) .......................... 2008 1 0305617

(51) Int. Cl.
*G06F 3/045* (2006.01)
(52) U.S. Cl. ...................... 345/174; 345/176; 178/18.06
(58) Field of Classification Search .......... 345/173–178; 178/18.01–18.07
See application file for complete search history.

(56) References Cited

U.S. PATENT DOCUMENTS

| | | | |
|---|---|---|---|
| 2011/0084290 A1* | 4/2011 | Nakamura et al. | 257/89 |
| 2011/0221741 A1* | 9/2011 | Kawamura et al. | 345/214 |
| 2012/0098414 A1* | 4/2012 | Nakamura | 313/504 |

FOREIGN PATENT DOCUMENTS

| | | |
|---|---|---|
| CN | 101187752AA | 5/2008 |
| WO | WO2008/108042 A1 | 9/2008 |

* cited by examiner

*Primary Examiner* — Vijay Shankar
(74) *Attorney, Agent, or Firm* — Altis Law Group, Inc.

(57) ABSTRACT

A touch panel includes a transparent base board, a mesh-shaped sensor portion formed on the base board and made of piezoelectric materials, a mesh-shaped black matrix formed on the sensor portion; and a pixel portion formed on portions of the base board exposed from the sensor portion and the black matrix for displaying images. When the base board is touched, the sensor portion transforms the pressure on the base board into piezoelectric signals for inputting operating instruction.

15 Claims, 4 Drawing Sheets

TOUCH PANEL WITH MESH-SHAPED SENSOR AND METHOD FOR MAKING THE SAME

BACKGROUND

1. Technical Field

The present disclosure relates to touch panels and methods for making the same, and particularly to a touch panel integrated with a display and a method for making the same.

2. Description of Related Art

Touch panels are widely used in electronic devices. In use, a touch panel can be mounted on a display of an electronic device, and images signals shown by the display are allowed to pass through the touch panel. Thus, the electronic device can be operated by touching the touch panel according to image indications shown by the display viewable through the touch panel.

In conventional fabrication, a touch panel is usually completed independently, and is then assembled to a display of an electronic device. However, the touch panel will increase the volume and weight of the electronic device, and the operation of mounting the touch panel to the display may damage and stain the touch panel or the display.

Therefore, there is room for improvement within the art.

BRIEF DESCRIPTION OF THE DRAWINGS

Many aspects of the present touch panel and method for making the same can be better understood with reference to the following drawings. The components in the various drawings are not necessarily drawn to scale, the emphasis instead being placed upon clearly illustrating the principles of the present touch panel and method for making the same. Moreover, in the drawings, like reference numerals designate corresponding parts throughout the figures.

DETAILED DESCRIPTION

Figure 1:
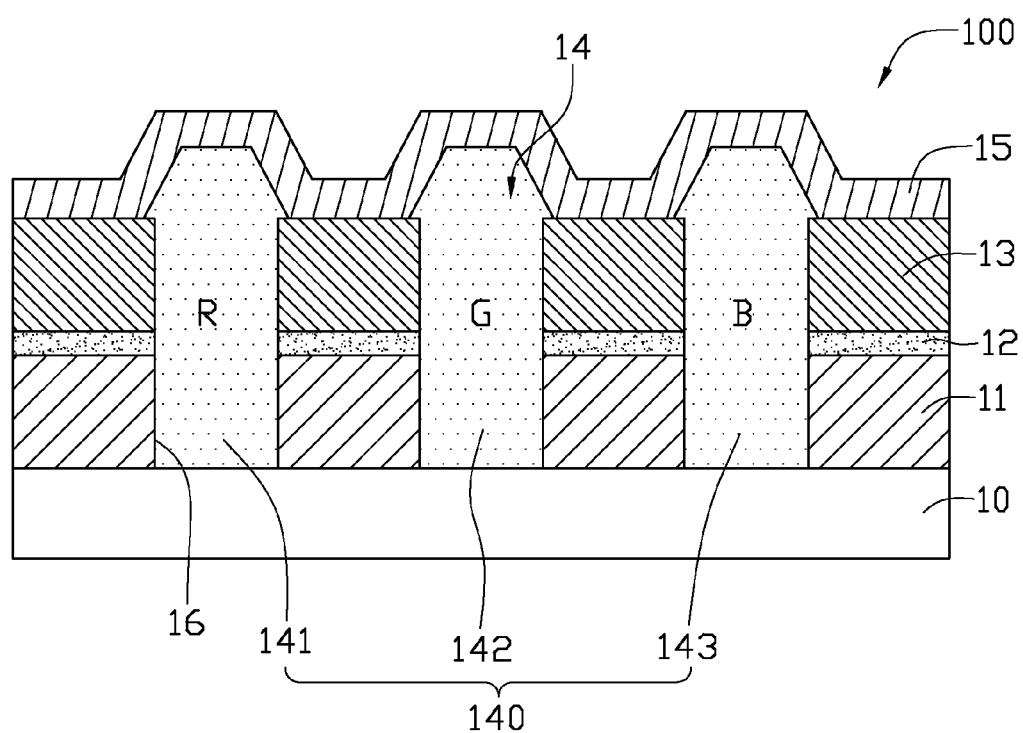
FIG. 1 is a cross-sectional view of a touch panel, according to an exemplary embodiment.

Referring to FIG. 1, a touch panel 100 according to an exemplary embodiment is shown. The touch panel 100 is used in an electronic device such as a mobile phone, a personal digital assistant (PDA) or a laptop computer to display images.

The touch panel 100 includes a base board 10, a sensor portion 11, an insulating portion 12, a black matrix 13, a pixel portion 14, and a transparent conductive layer 15.

The base board 10 is a transparent board made of glass. The sensor portion 11 is a mesh made of piezoelectric material, which is formed on a planar surface of the base board 10. The insulating portion 12 is a mesh corresponding to the sensor portion 11, which is formed on and covers the sensor portion 11. The black matrix 13 is a mesh corresponding to the sensor portion 11 and the insulating portion 12, which is entirely formed on and covers the entire insulating portion 12 and the entire sensor portion 11. The insulation portion 12 prevents shortages generated between the sensor portion 11 and the black matrix 13. The holes (not labeled) defined in the sensor portion 11, the insulating layer 12, and the black matrix 13 are aligned, thereby forming a plurality of filtering holes 16. A size of each filtering hole 16 corresponds to a size of a pixel of a display.

The pixel portion 14 includes a plurality of pixels 140, and each pixel 140 includes a plurality of sub-pixels 141/142/143. In fabrication, the pixel portion 14 is made of a colorized transparent material, such as resin. The colorized transparent material is filled in the filtering holes 16 to form the sub-pixels 141/142/143, which cooperatively form the pixels 140. Each pixel 140 includes three adjacent sub-pixels 141, 142, 143, and the three sub-pixels 141, 142, 143 are configured to respectively allow red, green and blue light to pass therethrough. Thus, the light emitting from the pixel 140 comprises three basic colors. When the luminance of light arriving at the sub-pixels 141/142/143 changes, the color of the light emitting from the pixels 140 changes correspondingly. Therefore, the plurality of pixels 140 can respectively change color and cooperatively display colorized images, and thus the pixel portion 14 can be used as a color filter. Understandably, each pixel 140 can further include more than three sub-pixels 141/142/143, and the sub-pixels 141/142/143 can be in more than three colors.

The transparent conductive layer 15 is a filter made of Indium Tin Oxides (ITO), which is formed on the black matrix 13 and the pixel portion 14, such that the sensor potion 11, the insulating portion 12, the black matrix 13 and the pixel portion 14 are all sandwiched between the base board 10 and the transparent conductive layer 15.

In assembly, the touch panel 100 is mounted on an electronic device and used as a portion of a display of the electronic device. Particularly, the base board 10 is positioned to be viewed by a user, and the transparent conductive layer 15 is positioned inside and towards an electrode layer (not shown) of a display of the electronic device. Liquid crystal is disposed between the transparent conductive layer 15 and the electrode layer, and the transparent conductive layer 15 and the electrode layer are both connected to electric power supplies (not shown). Thus, the transparent conductive layer 15 can be used as another electrode layer of the display.

In use, an electric field is generated between the transparent conductive layer 15 and the electrode layer, and the liquid crystal can be controlled to form images. When a backlight (not shown) is provided and emits light through the electrode layer, the liquid crystal and the touch panel 100, colors of the light emitting from the base board 10 is changed by the pixel portion 14 to form colorized images for display. The black matrix 13 can shield opaque portions of the electrode layer (e.g., wires mounted on the electrode layer) and prevent optical interference between adjacent pixels 140 or sub-pixels 141/142/143. Further, light aligned with the sensor portion 11 and the insulating portion 12 is also shielded by the black matrix 13, thus the sensor portion 11 and the insulating portion 12 do not interfere with display of the images.

Additionally, the sensor 11 is electronically connected to a data processor such as a CPU of the electronic device, such that users can touch an outside surface of the base board 10 to operate the electronic device. The images displayed by the touch panel 100 can indicate the touched positions to users. When the base board 10 is touched by a finger a pen/stylus of the like, portions of the base board 10 and the sensor portion 11 are pressed, and the pressure is then transformed into piezoelectric signals by the sensor portion 11. The processor determines the touched positions on the touch panel 100 according to the generating positions of the piezoelectric signals, and representing operating instruction corresponding to the touched position is input to the processor to control the electronic device.

Figure 2:
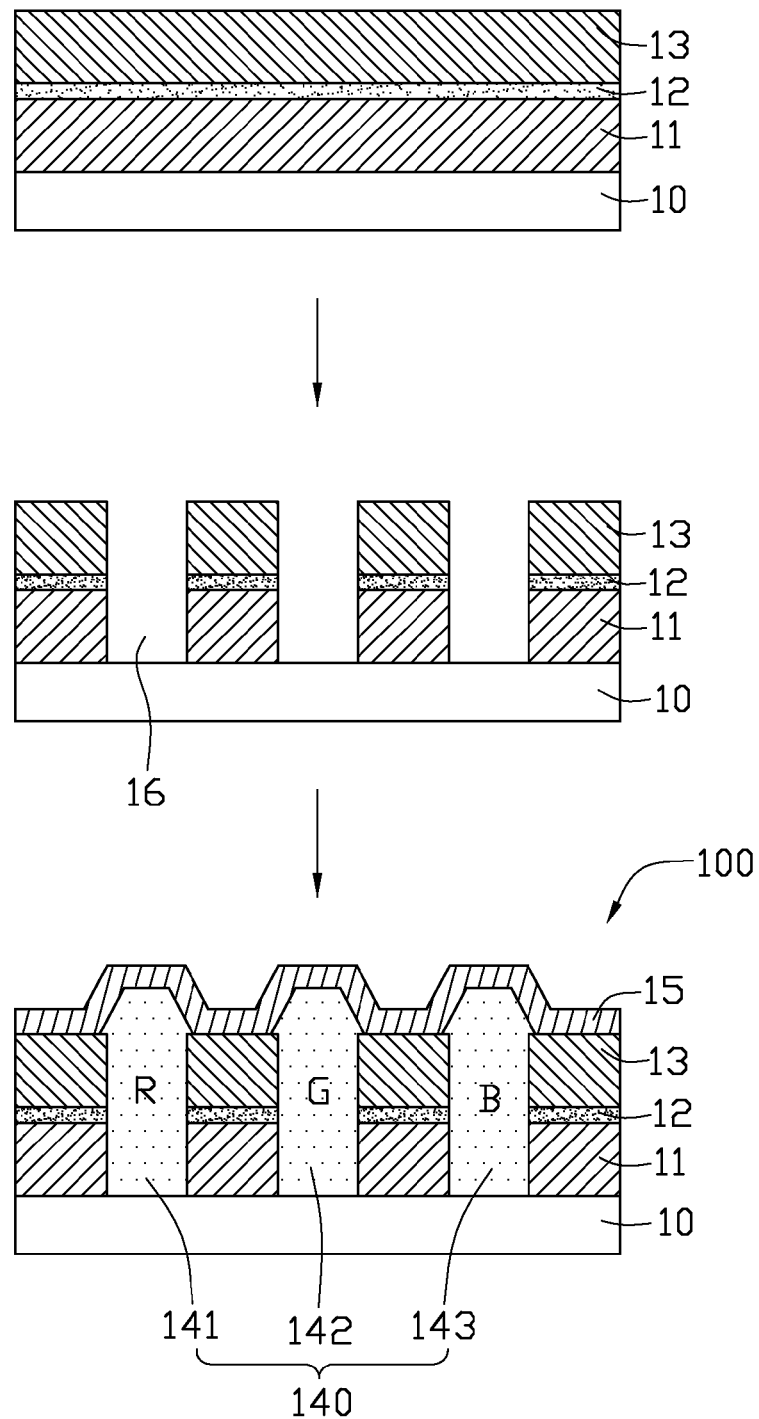
FIG. 2 is a schematic view of a method for making a touch panel, according to an exemplary embodiment.

Also referring to FIG. 2, a method for making touch panels (e.g., the touch panel 100), according to an exemplary embodiment, is provided. The method may include the following steps.

First, an above-mentioned base board 10 is provided.

A piezoelectric material layer is formed on a surface of the base board 10. An insulating material layer, such as a resin layer, is formed on the piezoelectric material layer. A shielding layer, such as a black resin layer or chrome layer, is formed on the insulating material layer.

Portions of the piezoelectric material layer, the insulating material layer, and the shielding layer are removed by etching or carving, thus a plurality of mesh layers are defined. The holes of each mesh layers are vertically aligned to form filtering holes 16. Thus, the sensor portion 11, the insulating portion 12 and the black matrix 13 are completed.

Colorized transparent materials such as resin are filled in the filtering holes 16 to form the above-mentioned sub-pixels 141/142/143 and further form the pixels 140 on the base board 10.

Finally, the transparent conductive layer 15 is formed on the black matrix 13 and the pixel portion 14 by sputtering. The sensor potion 11, the insulating portion 12, the black matrix 13 and the pixel portion 14 are all sandwiched between the base board 10 and the transparent conductive layer 15, and thus the touch panel 100 is completed.

Figure 3:
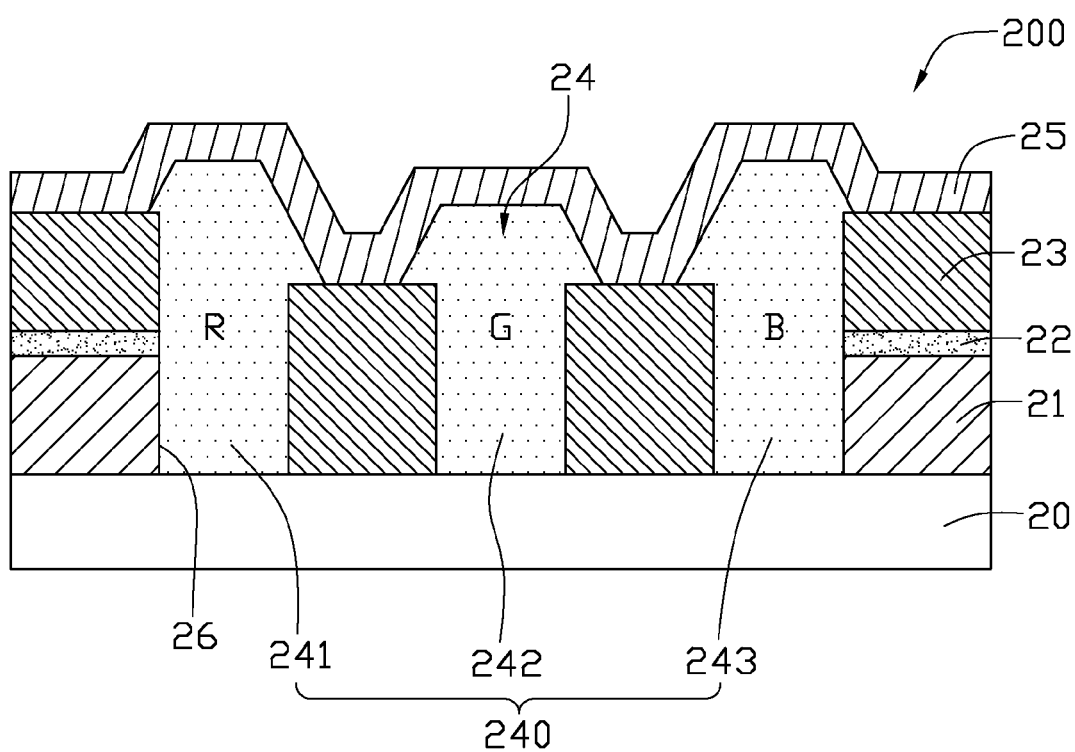
FIG. 3 is a cross-sectional view of a touch panel, according to another exemplary embodiment.

Referring to FIG. 3, a touch panel 200 according to another exemplary embodiment is shown. The touch panel 200 includes a base board 20, a sensor portion 21, an insulating portion 22, a black matrix 23, a pixel portion 24 and a transparent conductive layer 25, which respectively corresponds the base board 10, the sensor portion 11, the insulating portion 12, the black matrix 13, the pixel portion 14 and the transparent conductive layer 15, and are made of the same materials as the materials of the components of the touch panel 100, correspondingly. Similarly to the touch panel 100, the sensor 21, the insulating portion 22, the black matrix 23 and the transparent conductive layer 25 are orderly formed on the base board 20, and the sensor 21, the insulating portion 22 and the black matrix 23 are all formed as mesh layers. The pixel portion 24 is formed on the portions of the base board 20 exposed by the holes of the mesh of the black matrix 23, the insulating portion 22, and the sensor portion 21. The pixel portion 24 includes a plurality of pixels 240. Each pixel 240 includes at least three adjacent sub-pixels 241, 242, 243, and the sub-pixels 241, 242, 243 are respectively red, green and blue. The transparent conductive layer 25 covers the black matrix 23 and the pixel portion 24.

The main difference between the touch panel 200 and the touch panel 100 is that the mesh density of the sensor portion 21 and the insulating portion 22 are less than that of the sensor portion 11 and the insulating portion 12. The mesh density of the black matrix 23 is greater than that of the sensor portion 21 and the insulating portion 22, e.g., equal to the mesh density of the black matrix 13. Thus, the black matrix 23 covers the entire insulating portion 22 and the entire sensor portion 21, as well as portions directly formed on the base board 20.

In use, the touch panel 200 is similar to that of the touch panel 100. Understandably, the sizes of holes 26 formed by the mesh of the black matrix 23 (i.e., the sizes of the sub-pixels 141/142/143) are much less than the sizes of touch tools such as fingers, pens/styluses or the like used on the touch panel 200. When the base board 20 is pressed by the touch tool, the pressed area is much larger than the sizes of the black matrix 23, and thus a plurality of meshes of the black matrix 23 can be pressed. Therefore, if only the sensor portion 21 is installed under at least one of the pressed meshes of the black matrix 23, the pressure can be sensed and transformed into piezoelectric signals. Thus, the sensor portion 21 can be thinner than the black matrix 23, and the touch panel 200 can be operated by touch despite the sensor portion 21 not being installed under the entire black matrix 23. Compared with the touch panel 100, the area of the sensor portion 21 is less than that of the sensor portion 11, thus the touch panel 200 can use less piezoelectric materials to make the sensor portion 21 for decreasing cost.

Figure 4:
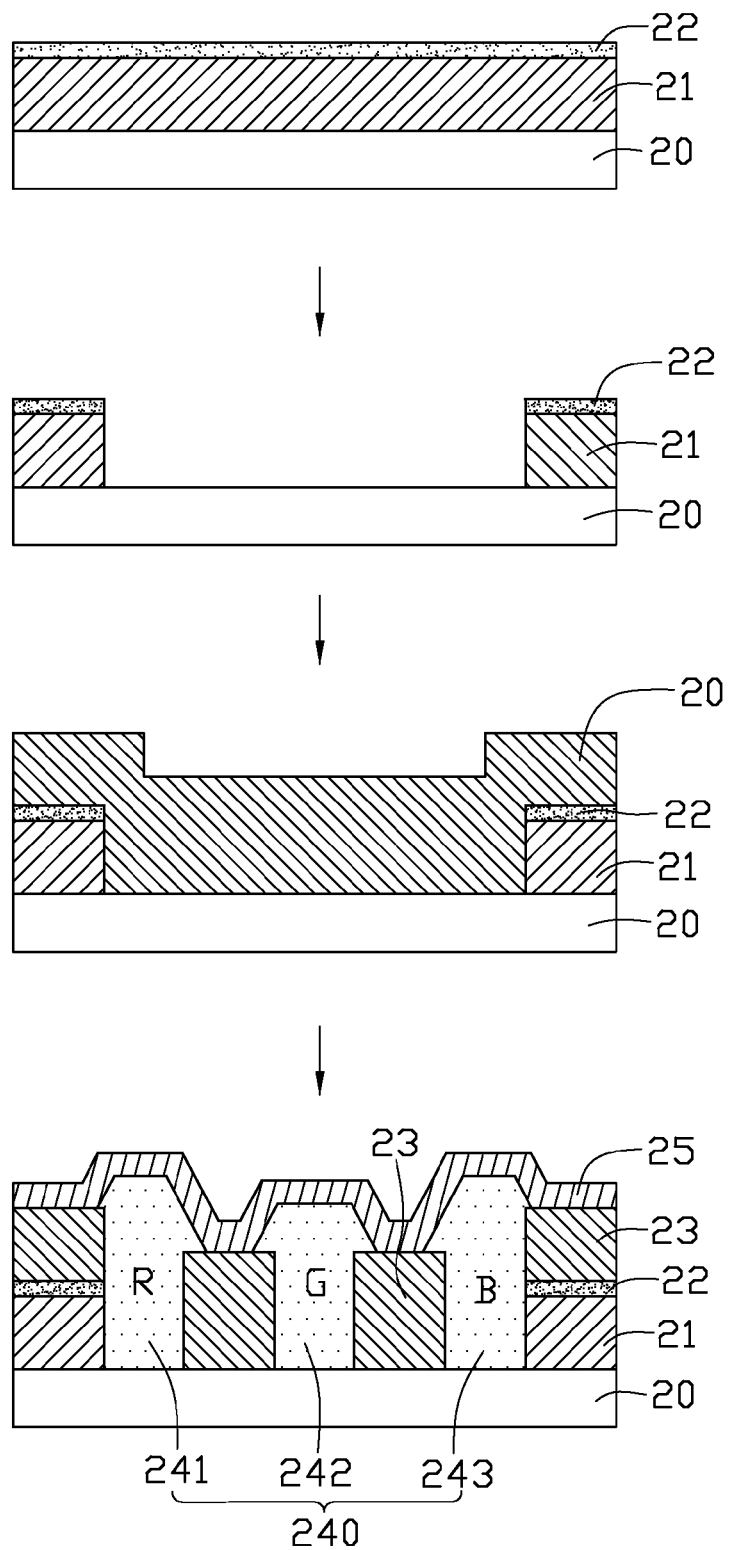
FIG. 4 is a schematic view of a method for making a touch panel, according to another exemplary embodiment.

Also referring to FIG. 4, a method for making touch panels (e.g., the touch panel 200), according to an exemplary embodiment, is provided. The method may include the following steps.

First, an above-mentioned base board 20 is provided.

A piezoelectric material layer is formed on a surface of the base board 20. An insulating material layer, such as a resin layer, is formed on the piezoelectric material layer.

Portions of the piezoelectric material layer and the insulating material layer are removed by etching or carving, thus the sensor portion 21 and the insulating portion 22 are completed.

A shielding layer, such as a black resin layer or chrome layer, is formed on the insulating portion 22 and portions of the base board 20 exposed from the sensor portion 21 and the insulating portion 22.

Portions of the shielding layer not covering the sensor portion 21 and the insulating portion 22 (i.e., the portions of the shielding layer directly formed on the base board 20) are removed by etching or carving, thus a plurality of meshes 26 are defined and the black matrix 23 are completed, and the sensor portion 21 and the insulating portion 22 are entirely covered by the black matrix 23.

Colorized transparent materials such as resin are filled in the holes 26 to form the plurality of sub-pixels 241/242/243 and further form the plurality of pixels 240 on the base board 20.

Finally, the transparent conductive layer 25 is formed on the black matrix 23 and the pixel portion 24 by means of sputtering. The sensor potion 21, the insulating portion 22, the black matrix 23 and the pixel portion 24 are all sandwiched between the base board 20 and the transparent conductive layer 25, and thus the touch panel 200 is completed.

In use of the touch panel 100/200, if the black matrix 13/23 is made of conductive materials such as chrome, the insulating portion 12/22 can prevent short circuit between the sensor portion 11/21 and the black matrix 13/23 or the transparent conductive layer 15/25. If the black matrix 13/23 is made of insulating materials such as resin, the insulating portion 12/22 can be omitted, i.e., the black matrix 13 can be directly formed on the sensor portion 11, and the black matrix 23 can be directly formed on the sensor portion 21 and the base board 200.

Generally, a display of an electronic device has at least one base board, a pixel portion, a black matrix and at least one electrode layer. The touch panel 100/200, the base board 10/20, the black matrix 13/23, the pixel portion 14/24 and the transparent conductive layer 15/25 can serve as corresponding conventional components of a display. Compared to conventional independent touch panels, the touch panel 100/200 integrated with a display of an electronic device decreases the size of the electronic devices. Further, the touch panel 100/200 can be fabricated by adding the sensor portion 11/21 and the insulating portion 12/22 to a display, thus the conventional method of assembling independent touch panels to displays can be omitted, which simplifies the fabricating operation and improves the quality of the touch panel 100/200.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A touch panel, comprising:
a transparent base board;
a mesh-shaped sensor portion formed on the base board, the mesh-shaped sensor portion being made of piezoelectric materials;
a mesh-shaped black matrix formed on the mesh-shaped sensor portion; and
a pixel portion formed on portions of the base board exposed from the mesh-shaped sensor portion and the mesh-shaped black matrix for displaying images; when the base board is touched, the mesh-shaped sensor portion transforms the pressure on the base board into piezoelectric signals representative of an operating instruction.

2. The touch panel as claimed in claim 1, further comprising a transparent conductive layer formed on the mesh-shaped black matrix and the pixel portion to sandwich the mesh-shaped sensor portion, the mesh-shaped black matrix and the pixel portion between the base board and the transparent conductive layer.

3. The touch panel as claimed in claim 2, wherein the transparent conductive layer is a filter made of Indium Tin Oxides (ITO).

4. The touch panel as claimed in claim 1, wherein the mesh-shaped black matrix is made of resin or chrome.

5. The touch panel as claimed in claim 1, further comprising an insulating portion formed between the mesh-shaped sensor portion and the mesh-shaped black matrix to prevent shortage generated between the mesh-shaped sensor portion and the mesh-shaped black matrix.

6. The touch panel as claimed in claim 1, wherein the mesh-shaped black matrix is entirely formed on the mesh-shaped sensor portion to cover the entire mesh-shaped sensor portion.

7. The touch panel as claimed in claim 1, wherein the mesh-shaped black matrix has some portions covering the entire mesh-shaped sensor portion amid other portions directly formed on the base board.

8. The touch panel as claimed in claim 1, wherein the pixel portion includes a plurality of pixels, and each pixel includes a plurality of adjacent sub-pixels formed on the base board and in the meshes of the mesh-shaped black matrix and the mesh-shaped sensor portion.

9. The touch panel as claimed in claim 8, wherein the sub-pixels fill the spaces in the mesh of the mesh-shaped black matrix.

10. The touch panel as claimed in claim 1, wherein the base board, the pixel portion, the mesh-shaped black matrix and the transparent conductive layer are portions of a display.

11. A method for making a touch panel, comprising:
providing a transparent base board;
forming a piezoelectric material layer on the base board and a shielding layer on the piezoelectric material layer;
removing portions of the piezoelectric material layer and the shielding layer to form a mesh-shaped sensor portion for transforming pressure on the base board into piezoelectric signals and a mesh-shaped black matrix covering the entire sensor portion;
forming a pixel portion for display images on portions of the base board exposed from the mesh-shaped black matrix; and
forming a transparent conductive layer on the mesh-shaped black matrix and the pixel portion.

12. The method as claimed in claim 11, further comprising the step of forming an insulating portion between the mesh-shaped sensor portion and the mesh-shaped black matrix prevent shortages generated between the mesh-shaped sensor portion and the mesh-shaped black matrix.

13. The method as claimed in claim 11, further comprising the step of filling colorized materials in meshes of the mesh-shaped black matrix to form the pixel portion.

14. The method as claimed in claim 11, wherein the mesh-shaped black matrix is entirely formed on the mesh-shaped sensor portion to cover the entire mesh-shaped sensor portion.

15. The method as claimed in claim 11, wherein some portions of the mesh-shaped black matrix are formed on the mesh-shaped sensor portion to cover the entire mesh-shaped sensor portion and other portions of the mesh-shaped black matrix are directly formed on the base board.

* * * * *